(12) United States Patent
Lee et al.

(10) Patent No.: US 7,546,677 B2
(45) Date of Patent: Jun. 16, 2009

(54) METHOD FOR FABRICATING A MICRO-ELECTROMECHANICAL SYSTEM SWITCH

(75) Inventors: Jae Woo Lee, Daejeon (KR); Chang Han Je, Jinju (KR); Sung Weon Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/898,002

(22) Filed: Sep. 7, 2007

(65) Prior Publication Data

US 2008/0034578 A1 Feb. 14, 2008

Related U.S. Application Data

(62) Division of application No. 11/086,320, filed on Mar. 23, 2005, now Pat. No. 7,283,025.

(30) Foreign Application Priority Data

Oct. 21, 2004 (KR) ................ 2004-84407

(51) Int. Cl.
*H01H 11/00* (2006.01)
*H01H 65/00* (2006.01)
(52) U.S. Cl. .............. 29/622; 29/25.03; 29/825; 29/846; 29/874; 29/876; 200/181; 335/78; 335/262
(58) Field of Classification Search .......... 29/622, 29/25.03, 825, 846, 874, 876; 200/181; 335/78, 262
See application file for complete search history.

(56) References Cited

U.S. PATENT DOCUMENTS 5,479,042 A 12/1995 James et al.
5,578,976 A 11/1996 Yao
6,307,452 B1 10/2001 Sun
6,441,405 B1 8/2002 Smith (Continued)

FOREIGN PATENT DOCUMENTS

JP 2000-090802 3/2000

(Continued)

OTHER PUBLICATIONS

Mihailovich et al.; "MEM Relay for Reconfigurable RF Circuits"; IEEE Microwave and Wireless Components Letters, vol. 11, No. 2, Feb. 2001; pp. 53-55.

(Continued)

*Primary Examiner*—Thiem Phan
(74) *Attorney, Agent, or Firm*—Lowe Hauptman Ham & Berner, LLP

(57) ABSTRACT

A method includes forming a signal line on the substrate so as to have a predetermined opening portion; at least one supporting frame each formed on the substrate at both sides of the signal line; a ground line formed on the substrate between the supporting frame and the signal line; a moving plate fixed to the supporting frame at both sides thereof, the moving plate being movable upward and downward; a switching unit positioned on the moving plate, the switching unit comprising contact means for connecting the opened signal line; and a supporting layer for supporting the moving plate and the switching unit, wherein the supporting layer comprises a support protrusion portion for maintaining a distance from the substrate.

7 Claims, 9 Drawing Sheets

U.S. PATENT DOCUMENTS

| | | |
|---|---|---|
| 6,535,091 B2 | 3/2003 | Bechtle et al. |
| 6,621,387 B1 | 9/2003 | Hopcroft |
| 6,657,525 B1 | 12/2003 | Dickens et al. |
| 6,720,851 B2 | 4/2004 | Hallbjorner et al. |
| 6,750,742 B2 | 6/2004 | Kang et al. |
| 6,806,545 B2 | 10/2004 | Shim |
| 6,876,482 B2 | 4/2005 | DeReus |
| 6,960,971 B2 | 11/2005 | Park et al. |
| 7,027,284 B2 | 4/2006 | Kobayahsi et al. |

FOREIGN PATENT DOCUMENTS

| | | |
|---|---|---|
| WO | 02/24466 | 3/2002 |

OTHER PUBLICATIONS

Hyman et al; "Surface-Micromachined RF MEMs Switches on GaAs Substrates"; CCC 1094-4290/99/040348-14; pp. 348-361.

PRIOR ART

PRIOR ART

METHOD FOR FABRICATING A MICRO-ELECTROMECHANICAL SYSTEM SWITCH

CROSS REFERENCE TO RELATED APPLICATION

This application is a division of U.S. application Ser. No. 11/086,320, filed on Mar. 23, 2005, now U.S. Pat. No. 7,283,025, which claims the benefit of REPUBLIC OF KOREA Patent Application No. 2004-84407, filed on Oct. 21, 2004.

BACKGROUND

1. Field of the Invention

The present invention relates to a switch for controlling signal delivery in a high frequency band wireless communication and a radio frequency (RF) system and, more specifically, to a micro-electromechanical systems switch driven by an electrostatic force and a method of fabricating the same.

2. Discussion of Related Art

In general, in a high frequency band communication system, a field effect transistor (FET), a PIN diode, or the like is used as a switching device for controlling signal delivery. These semiconductor switches are easily integrated but have for example high insertion loss, low isolation loss, and signal distortion. Therefore, a micro electromechanical systems (MEMS) switch has been widely studied to address the above problems.

The micro electromechanical systems switch is generally composed of a micro moving element that relatively moves against a substrate, and a driving element for driving the moving element. The driving element has two electrodes located to face each other and the moving element is driven by an electrostatic force generated by a voltage applied through the electrodes of the driving element. In other words, the moving element moves against the substrate in a parallel or horizontal direction, or rotates against the substrate within a predetermined angle.

FIGS. 1A and 1B are diagrams of an example of a typical cantilever type MEMS switch. FIG. 1A is a plan view of the typical cantilever type MEMS switch and FIG. 1B is a cross-sectional view taken along the line A1-A2 of FIG. 1A.

A lower electrode 2 and a signal line 3 are formed on a substrate 1, and a cantilever arm 5 fixed to the substrate 1 by a supporting unit 4 is positioned over the lower electrode 2 and the signal line 3. An upper electrode 6 is arranged on the cantilever arm 5, and a contact portion 7 for connecting a disconnected portion of the signal line 3 is formed below an end of the cantilever arm 5. The cantilever arm 5 and the upper electrode 6 have an intermediate portion formed to be narrower than other portions so that an end of the cantilever arm 5 has certain elasticity.

When a predetermined constant voltage is applied between the upper electrode 6 and the lower electrode 2, the cantilever arm 5 is bended downward by an electrostatic force generated in a capacitor structure 8 in which the upper electrode 6 and the lower electrode 2 are laminated. Accordingly, the contact portion 7 comes in contact with the disconnected portion of the signal line 3 to perform an switching operation (See U.S. Pat. No. 5,578,976 issued on Nov. 26, 1996)

In the cantilever as shown in FIGS. 1A and 1B, the signal line (inner wiring) 3 and the contact portion (short-circuit bar) 7 connected to an input and an output, respectively, are located perpendicular to each other, and only one side of the cantilever arm (dielectric layer) 5 is supported. Therefore, when the cantilever arm 5 or the upper electrode 6 is deformed by thermal expansion during a manufacturing process or operation process, it cannot move in a vertical direction as shown in FIG. 2A, but moves in a distorted manner as shown in FIG. 2B so that the contact between the signal line 3 and the contact portion 7 becomes worse. The bad contact increases contact resistance of the signal line 4, or makes signal delivery unstable, thereby degrading reliability.

FIG. 3 shows an example of a conventional membrane type MEMS switch.

A supporting frame 24, a lower electrode 14, and an opened signal line 18 are formed on a substrate 12, and a moving plate 20 constituting an upper electrode 16 is positioned over the lower electrode 14 and the signal line 18 with a certain gap therebetween. Further, the supporting frame 24 supports a spring 22 at both sides of the signal line 18 such that the moving plate 20 has certain elasticity.

When a predetermined driving voltage is applied to the lower electrode 14, the moving plate 20 of the upper electrode moves downward due to the electrostatic force generated between the lower electrode 14 and the upper electrode 16. Accordingly, a connection frame 34 positioned in the moving plate 20 connects the disconnected portion of the signal line 18 to perform a switch operation (See U.S. Pat. No. 6,307,452 issued on Oct. 23, 2001)

In the membrane type as shown in FIG. 3, the signal line 18 and the supporting frame 24 are located with long distance therebetween. Therefore, when the surface of the upper electrode 16 made of metal is deformed by thermal expansion during a manufacturing process or operation process, the moving plate 20 may not be in complete contact with the signal line 18 to be permanently opened between them, and stiction between the upper electrode 16 and the lower electrode 14 may occur due to a narrow distance between the upper electrode 16 and the lower electrode 14. Thus, stability and reliability of the switch is degraded.

In addition, when the moving plate 20 and the spring 22 are deformed by thermal expansion, the moving plate 20 cannot move in parallel with the substrate 12. This is because the moving plate is largely thermally expanded while the supporting frame 24 is fixed to the substrate 12 having much smaller thermal expansion than that of the moving plate 20 and accordingly there is little change in the distance between the supporting frames 24. The thermal expansion causes significant stress at a connection portion between the moving plate 20 and the spring 22, where permanent deformation is made. As a result, as the moving plate 20 is deformed, it is abnormally separated from the substrate 12 or is inclined into one side so that a normal switch operation is not performed. In addition, when the moving plate 20 moves down and is close to the substrate 12, the connection frame 34 of the moving plate 20 may be in permanent contact with the signal line 18.

In addition, both electrodes, which are applied with the voltage for generating the electrostatic force, remain very close each other in an interval of several micrometers, and it may cause a stiction problem that the moving plate 20 or the spring 22 sticks to other neighboring fixing elements, which acts as a very critical defect in the operation and reliability of the switch.

As described above, while the cantilever or membrane type MEMS switch has been proposed to address the problems of existing semiconductor switches, such as high insertion loss, low isolation loss, and signal distortion, it has low reliability and a signal isolation characteristic due to structural problems such as thermal deformation and stiction. Therefore, there is a need for a new MEMS switch capable of solving the aforementioned problems.

SUMMARY OF THE INVENTION

The present invention is directed to a micro electromechanical systems (MEMS) switch driven by an electrostatic force and a method of fabricating the same, in which thermal deformation and stiction problems generated by the structural problems of the existing MEMS switch can be solved.

The present invention is also directed to MEMS switch driven by an electrostatic force and a method of fabricating the same, in which a support protrusion portion having a wedge-shaped groove is formed to suppress thermal deformation of the moving plate generated during a manufacturing or operation process so that reliability and stability are improved.

In one aspect of the present invention, there is provided a micro-electromechanical systems switch comprising: a micro-electromechanical systems switch comprising: a substrate; a signal line formed on the substrate and having a predetermined opening portion; at least one supporting frame each formed on the substrate at both sides of the signal line; a ground line formed on the substrate between the supporting frame and the signal line; a moving plate fixed to the supporting frame at both sides thereof, the moving plate being movable upward and downward; a switching unit positioned on the moving plate, the switching unit comprising contact means for connecting the opened signal line; and a supporting layer for supporting the moving plate and the switching unit, wherein the supporting layer comprises a support protrusion portion for maintaining a distance from the substrate.

In another aspect of the present invention, there is provided a method of fabricating a micro-electromechanical systems switch comprising: a) forming a signal line having a predetermined opening portion, a supporting frame positioned at both sides of the signal line, and a ground line positioned between the supporting frame and the signal line on a substrate, respectively; b) forming a sacrificial layer having a predetermined thickness over the surface; c) forming grooves in the sacrificial layer at portions where ends of the signal line reach, respectively, and then, forming contact portions in the grooves; d) forming a hole in the sacrificial layer to expose the substrate between the opened signal lines, a support protrusion portion in the hole, and a supporting layer on the sacrificial layer other than the contact portion; e) forming a moving plate over the supporting frame and the sacrificial layer and over the supporting layer; f) forming a switching unit over the supporting layer and the contact portion inside the moving plate; and g) removing the sacrificial layer.

The present invention provides a micro-electromechanical systems switch and a method of fabricating the same in which the structural problems of the cantilever type and the membrane type switch are amended.

BRIEF DESCRIPTION OF THE DRAWINGS

The above and other features of the present invention will be described in reference to certain exemplary embodiments thereof with reference to the attached drawings in which.

DETAILED DESCRIPTION OF PREFERRED EMBODIMENTS

Exemplary embodiments of the present invention will now be described in detail with reference to the accompanying drawings. The following embodiments are provided for a through understanding to those skilled in the art, and a variety of modification can be made and the present invention is not limited to the following embodiments.

Figure 1A:
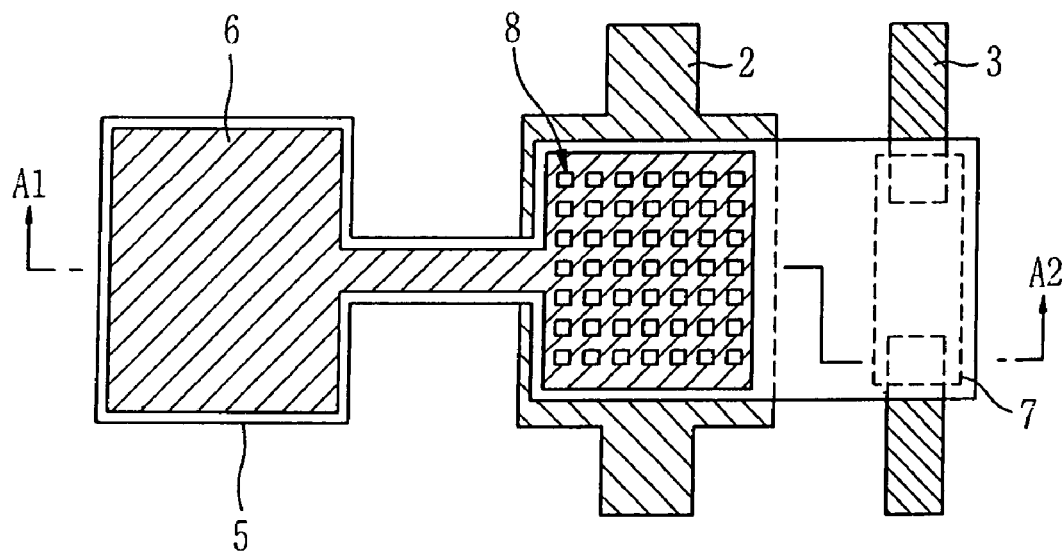
FIG. 1A is a plan view of a conventional cantilever type micro-electromechanical systems switch.
Figure 1B:
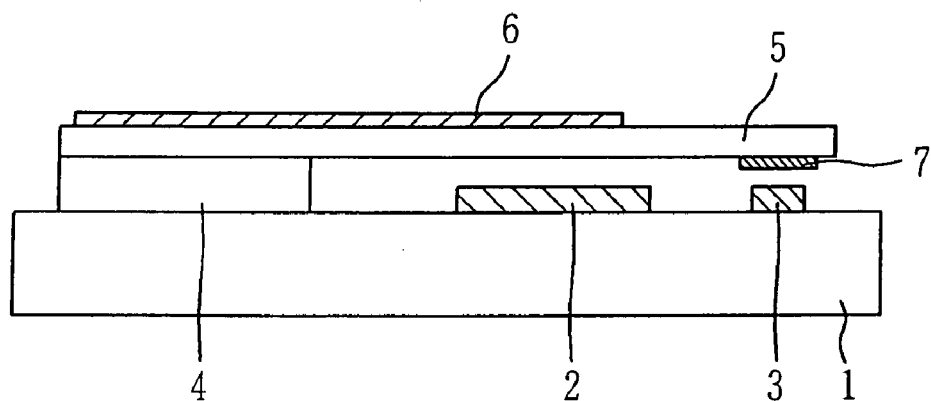
FIG. 1B is a cross-sectional view taken along the line A1-A2 of FIG. 1A.
Figure 2A:
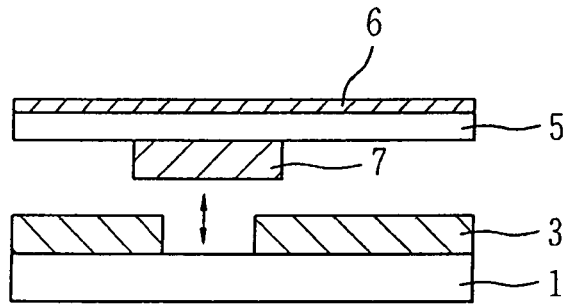
FIGS. 2A and 2B are cross-sectional views illustrating an operation of the conventional cantilever type micro-electromechanical systems switch.
Figure 2B:
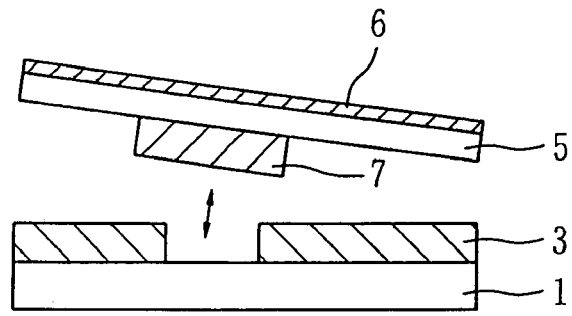
Figure 3:
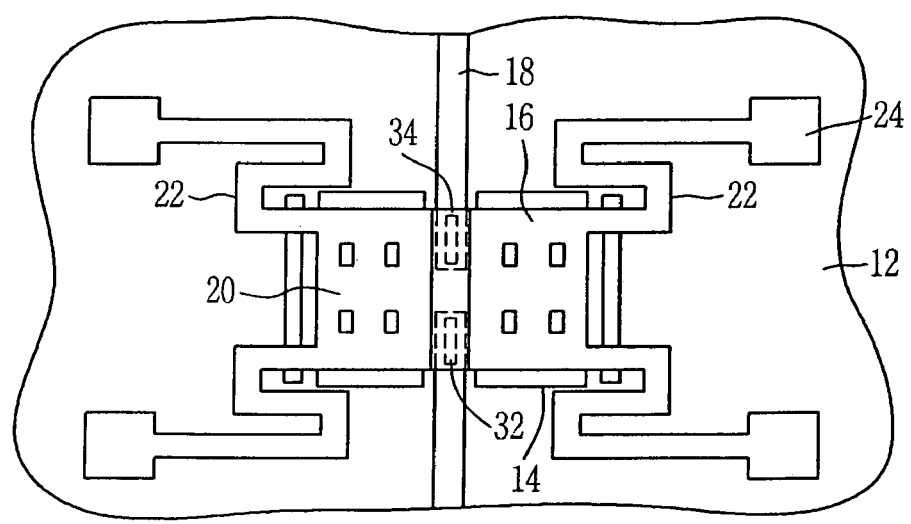
FIG. 3 is a plan view of a conventional membrane type micro-electromechanical systems switch.
Figure 4:
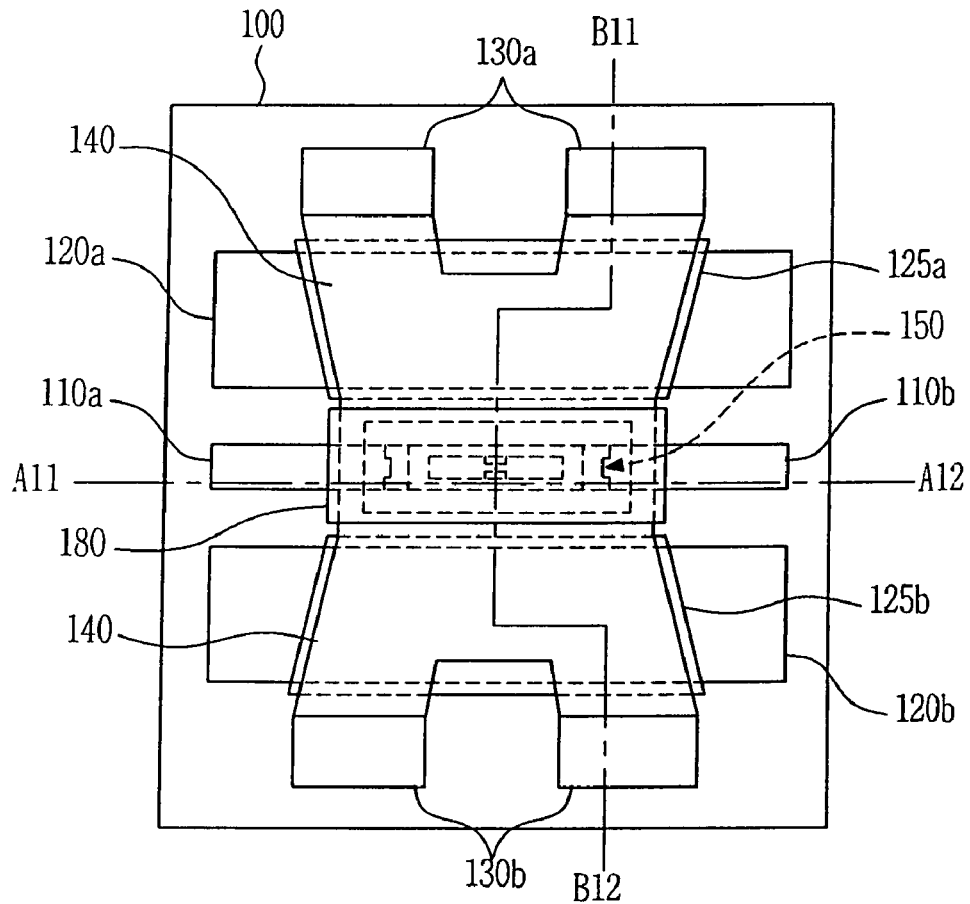
FIG. 4 is a plan view illustrating a micro-electromechanical systems switch according to an embodiment of the present invention.

FIG. 4 is a plan view for illustrating a micro-electromechanical systems switch according to an embodiment of the present invention. Description will be given below with reference to FIGS. 4, 5A, 5B and 6.

Input and output signal lines 110a and 110b for signal delivery are formed on a semiconductor or dielectric substrate 100. The input and output signal lines 110a and 110b are spaced (disconnected) from each other to have a predetermined disconnected portion 115. A pair of ground lines 120a and 120b are formed on the substrate at both sides of the input and output signals 110a and 110b to be parallel with the input and output signal lines 110a and 110b. At least one supporting frame 130a and 130b is formed with a constant interval on the substrate 100 outside the ground lines 120a and 120b. Both sides of a moving plate 140 made of material having an elastic restoration force are fixed to the supporting frames 130a and 130b, respectively, which are formed to be higher than the input and output signal lines 110a and 110b or the ground lines 120a and 120b. A part of the moving plate 140 is overlapped with the input and output signal lines 110a and 110b and the ground lines 120a and 120b, and an opening is formed at the center to expose the disconnected portion 115 of the input and output signal lines 110a and 110b. Since both sides of the moving plate 140 are fixed to the supporting frames 130a and 130b, the central portion can move upward and downward by an electrostatic force.

Figure 5A:
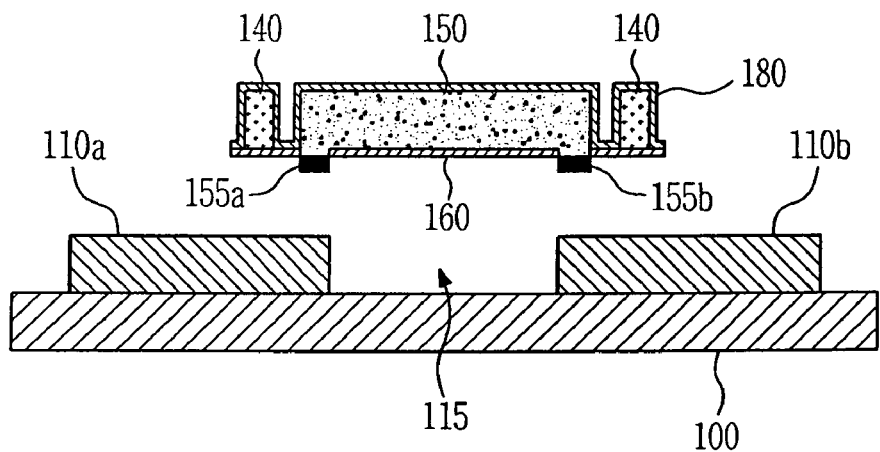
FIGS. 5A and 5B are cross-sectional views taken along the line A11-A12 of FIG. 4.
Figure 5B:
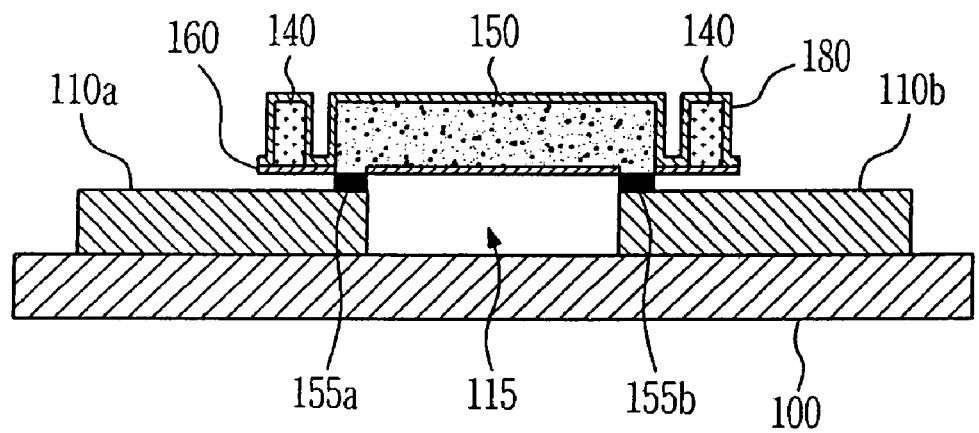

A rectangular switching unit 150 is formed in the opening of the moving plate 140 where the disconnected portion 115 is exposed, wherein the switching unit has a center opening and two " ⊏ "-shape sides like "#". The switching unit 150 is fixed to the moving plate 140 by the central supporting layer 160 and the dielectric layer 180, as shown in FIGS. 5A and 5B. To prevent a loss due to reflection of an RF signal, preferably, the switching unit 150 existing in the moving plate 140 is kept insulated from the moving plate 140 and has a shape corresponding to that of the input and output signal lines 110a and 110b.

With the switching unit 150 configured as above, operational properties can be enhanced as follows: First, when an opening is formed in the switching unit 150 made of a conductor in a range where the RF signal is not attenuated (which is called a skin effect), a spring coefficient showing a degree of elasticity can be reduced. When the spring coefficient is reduced, the moving plate 140 rapidly and exactly controls the switching unit 150 so that reliability can be significantly improved. Second, the signal isolation characteristic at a state where the input and output signal lines 110a and 110b are disconnected is determined by coupling capacitance of the two signal lines 110a and 110b, and as the coupling capacitance is smaller, the signal isolation characteristic becomes better. Rectangular contact portions 155a and 155b and the signal lines 110a and 110b are overlapped at many portions and accordingly have large coupling capacitance and exhibit low signal isolation characteristic. Therefore, by forming both sides of the switching unit 150 in the "⊏"-shape in the range where the RF signal is not attenuated, the signal isolation characteristic can be improved.

In order to electrically connect the input and output signal lines 110a and 110b, the contact portions 155a and 155b are protruded below the switching unit 150 so that the contact portions 155a and 155b reach to the ends of the input and output signal lines 110a and 110b of the disconnected portion 115. Further, a central supporting layer 160 is formed below the switching unit 150 and below the center of the moving plate 140 to support a part of the switching unit 150 and the moving plate 140. A support protrusion portion 165 extended to reach to the substrate 100 is formed, at a position where the central unit of the central support layer 160, i.e., the center of the disconnected portion 115 is located, to maintain a constant distance from the substrate. A wedge-shaped groove 170 having a constant interval is formed in the support protrusion portion 165. The groove 170 formed in the support protrusion portion 165 may have the wedge-shape with the uniform width as well as with smaller or larger width at an upper portion.

The moving plate 140 supported by the supporting frames 130a and 130b has a large area. Therefore, the central portion located relatively far from the supporting frames 130a and 130b may be easily deformed even when a constant voltage is applied. Thus, according to the present invention, the support protrusion portion 165 having the wedge-shaped groove is formed at the central portion of the moving plate 140 to suppress the deformation of the moving plate 140 without changing an inherent spring coefficient of the moving plate 140. The support protrusion portion 165 is formed at the center of the moving plate 140 to maximize the movement of the switching unit 150, and the groove 170 is arranged independently of the switching unit 150.

Further, in order to control the flow of an RF signal through the input and output signal lines 110a and 110b, driving directions of the switching unit 150 and the moving plate 140 should be matched with each other. Therefore, the moving plate 140 and the switching unit 150 are arranged on the same plane, and the central support layer 160 made of dielectric material is used to connect the moving plate 140 and the switching unit 150, so that the moving plate 140 and the switching unit 150 are supported, and at the same time, when the constant voltage is applied to the moving plate 140, the switching unit 150 is electrically insulated.

Further, dielectric layers 125a and 125b having a predetermined thickness can be formed on the surface of the ground lines 120a and 120b to prevent short-circuit between the ground lines 120a and 120b and the moving plate 140, and dielectric material 180 having a predetermined thickness is formed on the switching unit 150 and the moving plate 140 to tightly couple the switching unit 150 and the moving plate 140.

An operation of the micro-electromechanical systems switch configured as described above according to the present invention will now be described.

When a predetermined DC driving voltage is applied between the moving plates 140 used as an upper electrode and the ground lines 120a and 120b used as lower electrodes, attraction is exerted between the moving plate 140 and the ground lines 120a and 120b due to the electrostatic force. Since the ground lines 120a and 120b are fixed to the substrate 100, the elastic moving plate 140 is bended toward the ground lines 120a and 120b. With the bended moving plate 140, the contact portions 155a and 155b of the switching unit 150 are connected to the input and output signal lines 110a and 110b, as shown in FIG. 5b, for signal flow. Here, since the dielectric layers 125a and 125b are formed between the moving plate 140 and the ground lines 120a and 120b, the moving plate 140 and the ground lines 120a and 120b are prevented from being electrically short-circuited.

When the DC driving voltage applied to the moving plate 140 and the ground lines 120a and 120b is removed, the contact portions 155a and 155b of the switching unit 150 move upward, as shown in FIG. 5A, by a restoration force due to the spring coefficient of the moving plate 140, and the input and output signal lines 110a and 110ba are opened to block the signal flow.

The signal isolation characteristic of the micro-electromechanical systems switch operated as described above is determined by coupling capacitance due to an interval of the input and output signal lines 110a and 110b and coupling capacitance due to overlap of the contact portion 155a and 155b and the input and output signal lines 110a and 110b. Therefore, in order to obtain a excellent signal isolation characteristic, the interval between the input and output signal lines 110a and 110b and the contact portions 155a and 155b and the interval between the input and output signal lines 110a and 110b should be both considered.

Figure 6:
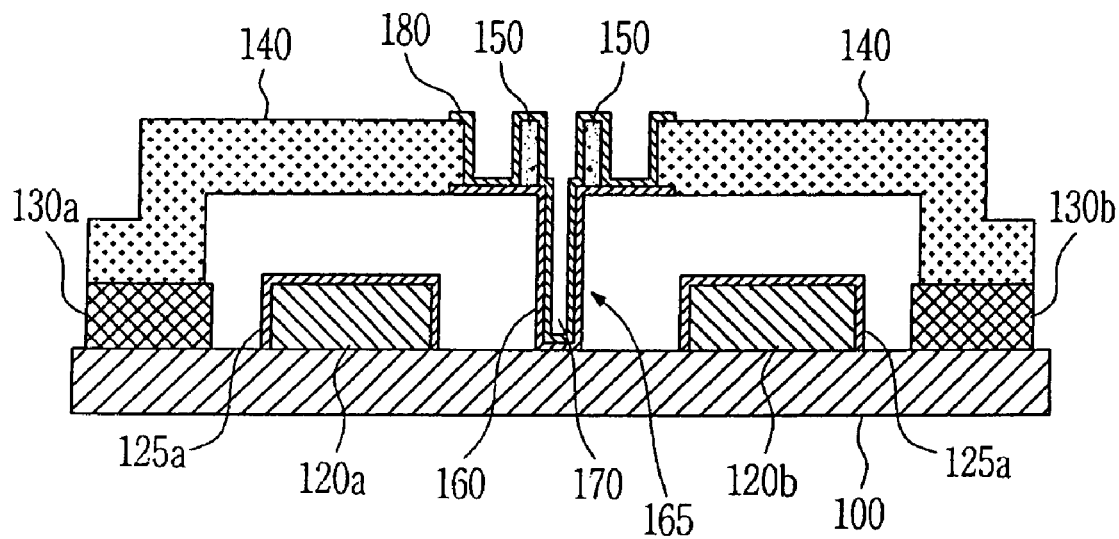
FIG. 6 is a cross-sectional view taken along the line B11-B12 of FIG. 4.

As shown in FIG. 6, in the micro-electromechanical systems switch having the central supporting layer 160 of the present invention, the interval between the input and output signal lines 110a and 110b, i.e., the size of the disconnected portion 115 can be much larger than that of the existing micro-electromechanical systems switch. Accordingly, when the interval between the input and output signal lines 110a and 110b and the contact portions 155a and 155b is maintained constant, the relatively favorable signal isolation characteristic can be obtained. In addition, since the spring coefficient of the moving plate 140 formed between the supporting frames 130a and 130b and the wedge-shaped groove 170 are relatively larger than that of the existing micro-electromechanical systems switch, it can be driven with a lower driving voltage as compared to the existing micro-electromechanical systems switch.

In the existing micro-electromechanical systems switch, the moving plate is fixed to both sides so that it is vulnerable to a thermal deformation, and a stiction problem that the moving plate used as and upper electrode is adhered to other fixing elements due to the small interval between the moving plate and the ground line can easily occur. This stiction problem occurs due to the existence of contaminants generated during a manufacturing process or moistures between the moving plate and the substrate having a gap of several micrometers, which acts as a factor to make the switch unstably operated. Therefore, by forming the central supporting layer 160 having the wedge-shaped groove at the center of the moving plate, the operation voltage can be maintained constant and the stiction is prevented, so that the switch can be operated in a stable manner.

Figure 7A:
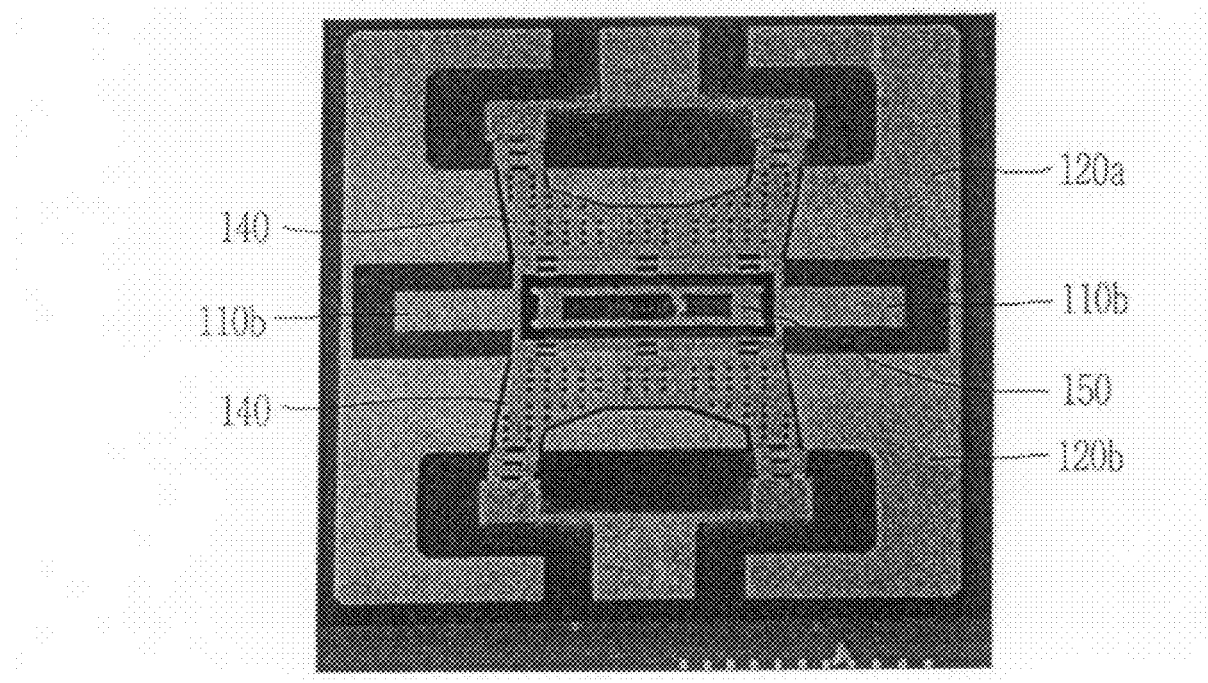
FIG. 7A is a picture taken by an electron microscopic for illustrating an example of a micro-electromechanical systems switch according to an embodiment of the present invention.
Figure 7B:
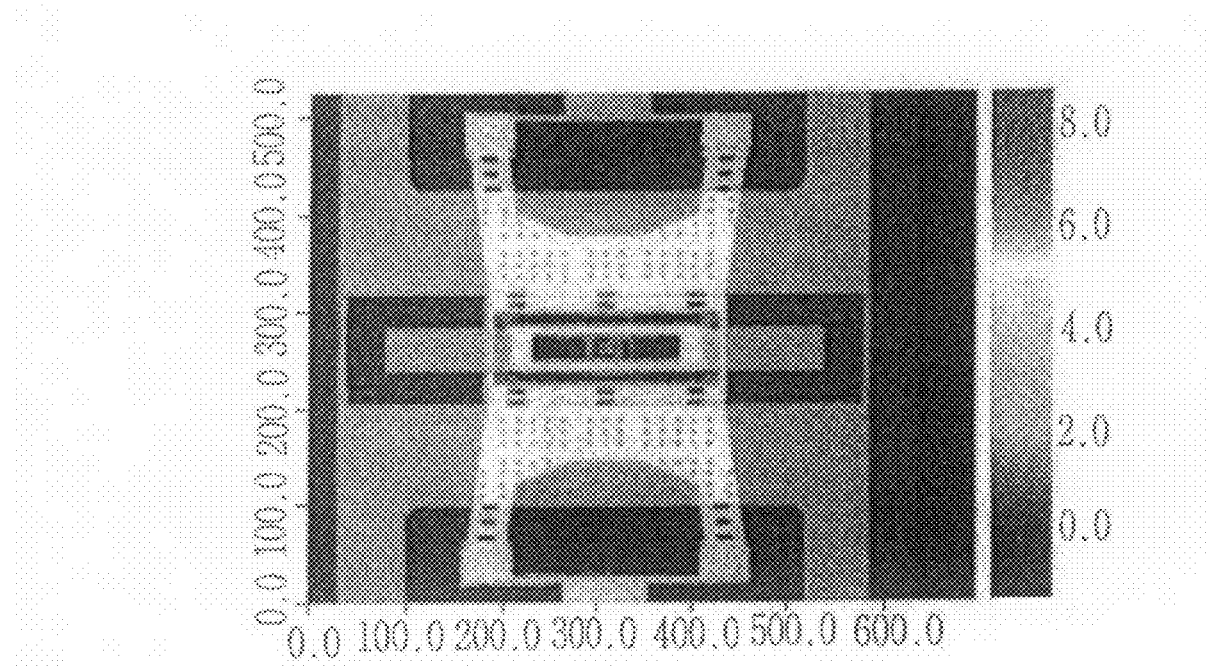
FIG. 7B is a diagram showing a measurement result of a 3D profiler of a micro-electromechanical systems switch according to an embodiment of the present invention.

FIG. 7A is a picture taken by an electron microscopic illustrating an example of a micro-electromechanical systems switch according to an embodiment of the present invention, and FIG. 7B is a diagram showing a measurement result of a 3D profiler of a micro-electromechanical systems switch according to an embodiment of the present invention.

Referring to FIG. 7A, which shows an example in which shapes of the ground lines 120a and 120b are modified, a variety of modifications of the ground lines 120a and 120b shown in FIG. 4 can be made. In addition, FIG. 4 shows an embodiment of a single pole single throw (SPST) structure. While one input and output signal line 110a and 110b has been illustrated, the present invention is not limited thereto and a single pole multi throw (SPMT) having one input signal line and two or more output signal lines can be also used.

Referring to FIG. 7B, which shows a measurement result when the substrate 100 is heated up to a temperature of about 200☐, it can be seen that the moving plate 140 and the switching unit 150 can be supported and maintained at a constant interval from the substrate 100 by the central supporting layer 160 having the wedge-shaped groove 170 so that the thermal deformation of the moving plate is suppressed. Further, when the moving plate 140 located at a constant height on the input and output signal lines 110a and 110b and the ground lines 120a and 120b is located at about 6 as indicated at the right side of FIG. 6 when the substrate 100 is defined as a reference value '0' so that the thermal deformation is hardly generated.

A method of fabricating the micro-electromechanical systems switch of the present invention configured as described above will be described with reference to FIGS. 8 to 15. FIGS. 8A to 15A show cross-sectional views taken along the line A11-A12 of FIG. 4, and FIGS. 8B to 15B show cross-sectional views taken along the line B11-B12 of FIG. 4.

Figure 8A:
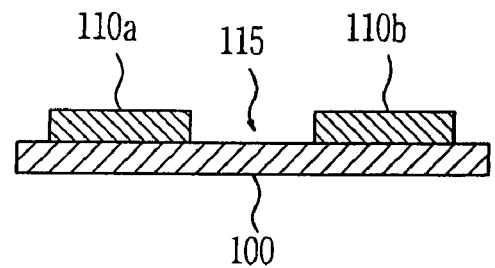
FIGS. 8A to 15B are cross-sectional views for illustrating a method of fabricating a micro-electromechanical systems switch according to an embodiment of the present invention.
Figure 8B:
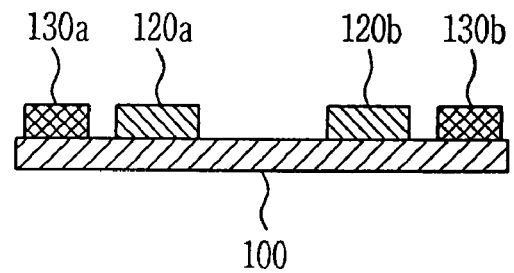

Referring to FIGS. 8A and 8B, the input and output signal lines 110a and 110b and the ground lines 120a and 120b as well as at least one supporting frame 130a and 130b are formed on a semiconductor or dielectric substrate by thin-film deposition and patterning or electro plating. The input and output signal lines 110 and 110b for signal delivery are formed spaced at a predetermined interval to have the disconnected portion 115, and the ground lines 120a and 120b are formed at both sides of the input and output signal lines 110a and 110b in the form of a strip in parallel with the input and output signal lines 110a and 110b. In addition, the supporting frames 130a and 130b are formed outside the ground lines 120a and 120b with a constant interval. Preferably, the input and output signal lines 110a and 110b and the ground lines 120a and 120b are made of noble metal such as Au.

Figure 9A:
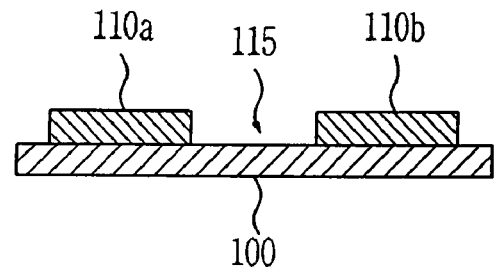
Figure 9B:
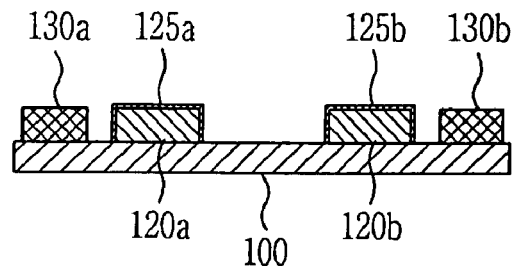

Referring to FIGS. 9A and 9B, dielectric layers 125a and 125b having a predetermined thickness are formed to surround the ground lines 120a and 120b. The dielectric layers 125a and 125b prevent the ground lines 120a and 120b used as lower electrodes and the moving plate 140 used as an upper electrode from electrically short-circuited to each other.

Figure 10A:
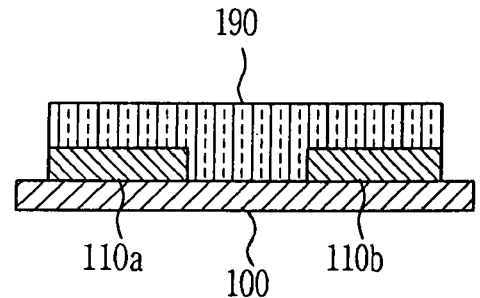
Figure 10B:
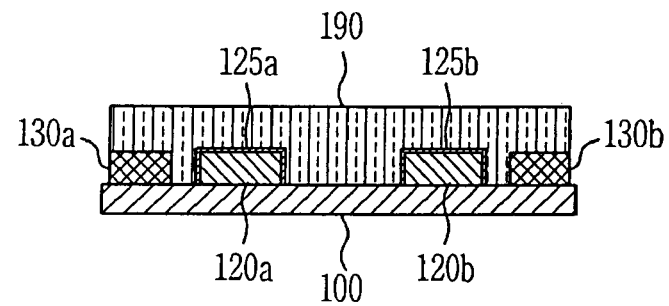

Referring to FIGS. 10A and 10B, a sacrificial layer 190 having a predetermined thickness is formed over the surface having the input and output signal lines 110a and 100b, the ground lines 120a and 120b, and the supporting frames 130a and 130b.

Figure 11A:
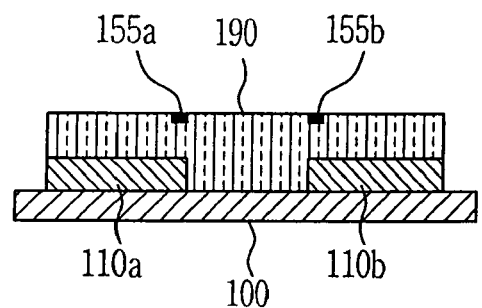
Figure 11B:
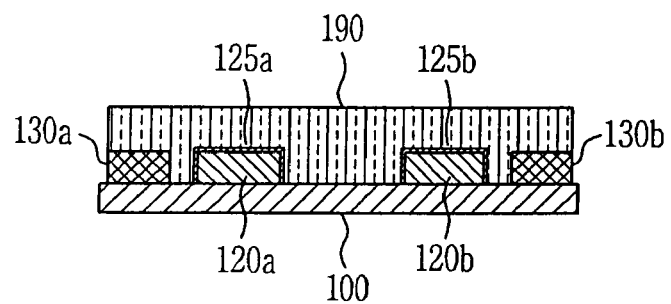

Referring to FIGS. 11a and 11b, after grooves are formed in the sacrificial layer at portions where the ends of the input and output signal lines 110a and 110b reach using a mask process using a predetermined photoresist, respectively, the contact portions 155a and 155b are formed in the grooves.

Figure 12A:
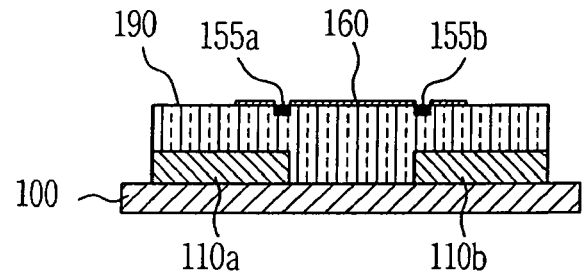
Figure 12B:
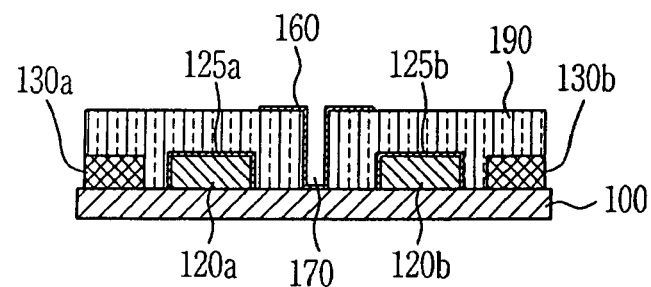

Referring to FIGS. 12a and 12b, after holes are formed in the sacrificial layer 190 to expose the substrate between the opened input and output signal lines 110a and 110b, a central supporting layer 160 having a predetermined thickness is formed over the surface other than the contact portions 155a and 155b. The support protrusion portion 165 vertically extended to reach to the substrate 100 is formed at the central unit of the central supporting layer 160, i.e., the center of the disconnected portion 115 to maintain the constant interval from the substrate 100. Since the support protrusion portion 165 is thin, a wedge-shaped groove 170 having a constant width is formed.

Preferably, the central supporting layer 160 is made of a silicon nitride layer formed by a plasma enhanced chemical vapor deposition (PECVD) method, or of polyimide formed by a spin coating method, for example.

Figure 13A:
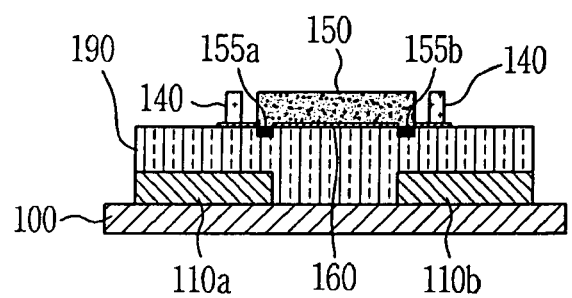
Figure 13B:
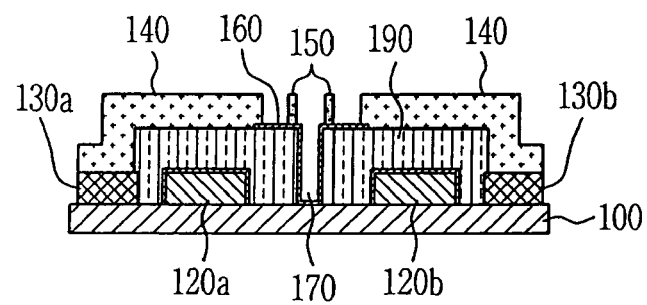

Referring to FIGS. 13a and 13b, the moving plate 140 is formed over the supporting frames 130a and 130b and the sacrificial layer 190 and over one side of the central supporting layer 160. At the same time, the rectangular shape switching unit 150 is formed over the contact portions 155a and 155b inside the moving plate 140 and the central supporting layer 160, wherein switching unit 150 has a center opening and two " ⊏ " shaped sides like a "#" shape to reach the ends of the input and output signal lines 110a and 10b.

Figure 14A:
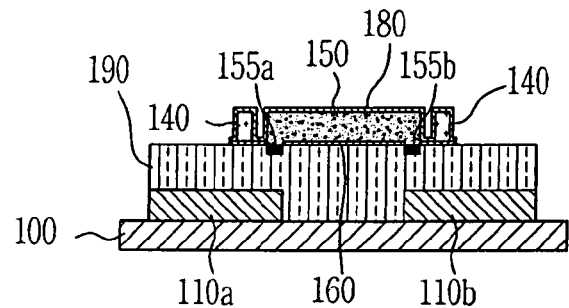
Figure 14B:
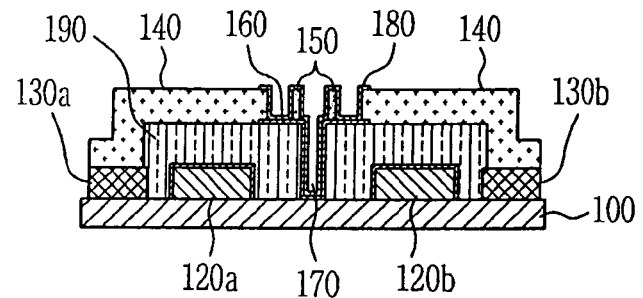

Referring to FIGS. 14a and 14b, the dielectric material having a predetermined thickness is formed on the surface of the exposed central support layer 160 and the switching unit 150. Preferably, the dielectric layer 170 is made of a silicon nitride layer formed by PECVD or of polyimide formed by spin coating, for example. The switching unit 150 and the central supporting layer 160 are tightly coupled by using the dielectric material 180.

Figure 15A:
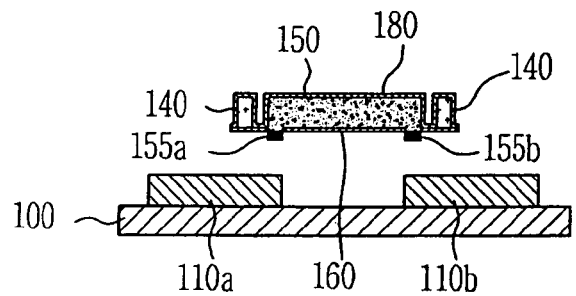
Figure 15B:
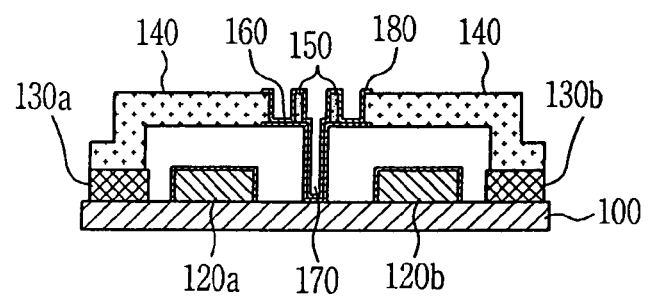

Referring to FIGS. 15a and 15b, the sacrificial layer 190 formed between the moving plate 140 and the input and output signal lines 110a and 110b is removed, for example, by a reactive ion etching (RIE) method or a wet etching method to complete the micro-electromechanical systems switch of the present invention.

According to the micro-electromechanical systems switch of the present invention, by forming the central supporting layer having a support protrusion portion at the center of the moving plate to maintain an interval with the substrate, the thermal deformation generated during a manufacturing process and an operation process can be prevented. Thus, the contact between the contact portion and the signal line is stably made so that a stiction problem is prevented and the operation voltage is stably maintained. Therefore, the insertion loss and signal isolation characteristic are improved.

As described above, in the micro-electromechanical systems switch in which the structural problems of the existing cantilever or the membrane type switch are solved, a contact portion is formed in the same direction as that of the signal line, and a central support layer having a support protrusion portion is formed at the center of the moving plate to maintain the interval with the substrate. Therefore, the contact of the signal line is stably made so that reliability is improved. In addition, with the stable structure as described above, the defects generated during the manufacturing process can be minimized and the manufacturing process is relatively simple and easy so that the fabrication throughput can be enhanced.

As described above, exemplary embodiments of the present invention have been described with reference to the detailed description and the drawings. Terms are used for illustration only, and should not be construed to limit the scope of the present invention described in the claims. Therefore, those skilled in the art will appreciate that a variety of modifications and equivalents thereto can be made. Accordingly, the scope of the present invention will be defined to the subject matter of the following claims.

What is claimed is:

1. A method of fabricating a micro-electromechanical systems switch, comprising:
   a) forming:
      a signal line comprising an input line and an output line formed so that the input line and the output line are aligned and an input line end of the input line is located opposite an output line end of the output line across a predetermined opening portion,
      supporting frames on either side of the signal line, and
      first and second ground lines, respectively between the supporting frames and the signal line on a substrate;
   b) forming:
      a sacrificial layer having a predetermined thickness over the surface of the input line, the output line, the supporting frames and the ground lines;
   c) forming:
      first and second grooves in the sacrificial layer at portions located over the input line end and the output line end, respectively, and then,
      forming first and second contact portions in the first and second grooves;
   d) forming:
      a hole in the sacrificial layer which extends through the sacrificial layer to expose a portion of the substrate between the first and second ground lines,
      a support protrusion portion in the hole, and
      a supporting layer on the sacrificial layer other than the contact portion;
   e) forming a moving plate over the supporting frames and the sacrificial layer and over the supporting layer;
   f) forming a switching unit over the supporting layer and the contact portion inside the moving plate; and
   g) removing the sacrificial layer.

2. The method according to claim 1, further comprising after the step (a), forming a dielectric layer on a surface of the ground line.

3. The method according to claim 1, wherein the signal line, the ground lines and the supporting frames are formed by a thin film deposition and patterning process or by an electro plating process.

4. The method according to claim 1, wherein the switching unit is formed to have a rectangular shape having a center opening.

5. The method according to claim 1, further comprising after the step (g), forming a dielectric layer on a surface of the exposed supporting layer and the switching unit.

6. The method according to claim 5, wherein the supporting layer is made of a silicon nitride layer and the dielectric layer is made of polyimide, and wherein each silicon nitride layer is formed by a plasma enhanced chemical vapor deposition method and the polyimide is formed by a spin coating method.

7. The method according to claim 1, wherein the sacrificial layer is removed by any one of a reactive ion etching method and a wet etching method.

* * * * *